US005505413A

United States Patent [19]
Hennessey

[11] Patent Number: 5,505,413
[45] Date of Patent: Apr. 9, 1996

[54] A-FRAME INSTRUMENT STAND

[76] Inventor: James R. Hennessey, 7 Sunrise Hill Dr., West Hartford, Conn. 06107

[21] Appl. No.: 265,920

[22] Filed: Jun. 27, 1994

[51] Int. Cl.$^{6}$ .................... F16M 11/38
[52] U.S. Cl. .................... 248/166; 84/327
[58] Field of Search .................... 248/166, 164, 248/168, 169, 443, 460; 84/327

[56] References Cited

U.S. PATENT DOCUMENTS

| | | | |
|---|---|---|---|
| 1,673,205 | 6/1928 | Romao | 84/327 X |
| 1,684,912 | 9/1928 | Dunklau | 84/327 X |
| 5,029,796 | 7/1991 | Schoenig | 248/166 X |
| 5,350,143 | 9/1994 | Hoshino | 248/460 X |
| 5,375,497 | 12/1994 | Pirchio | 84/327 |
| 5,383,634 | 1/1995 | Liao | 248/168 X |

FOREIGN PATENT DOCUMENTS

| | | | |
|---|---|---|---|
| 2276314 | 9/1994 | United Kingdom | 84/327 |

*Primary Examiner*—J. Franklin Foss
*Attorney, Agent, or Firm*—Ira S. Dorman

[57] ABSTRACT

The stand is collapsible to a compact configuration by virtue of utilizing foot members that pivot and slide on the associated leg members. A tandem version of the stand enables the support of two guitars or other instruments, an extensible post serves to engage the neck of the instrument, and an elliptical end-cap is mounted rotatably on one of the legs to enable facile leveling of the stand.

13 Claims, 8 Drawing Sheets

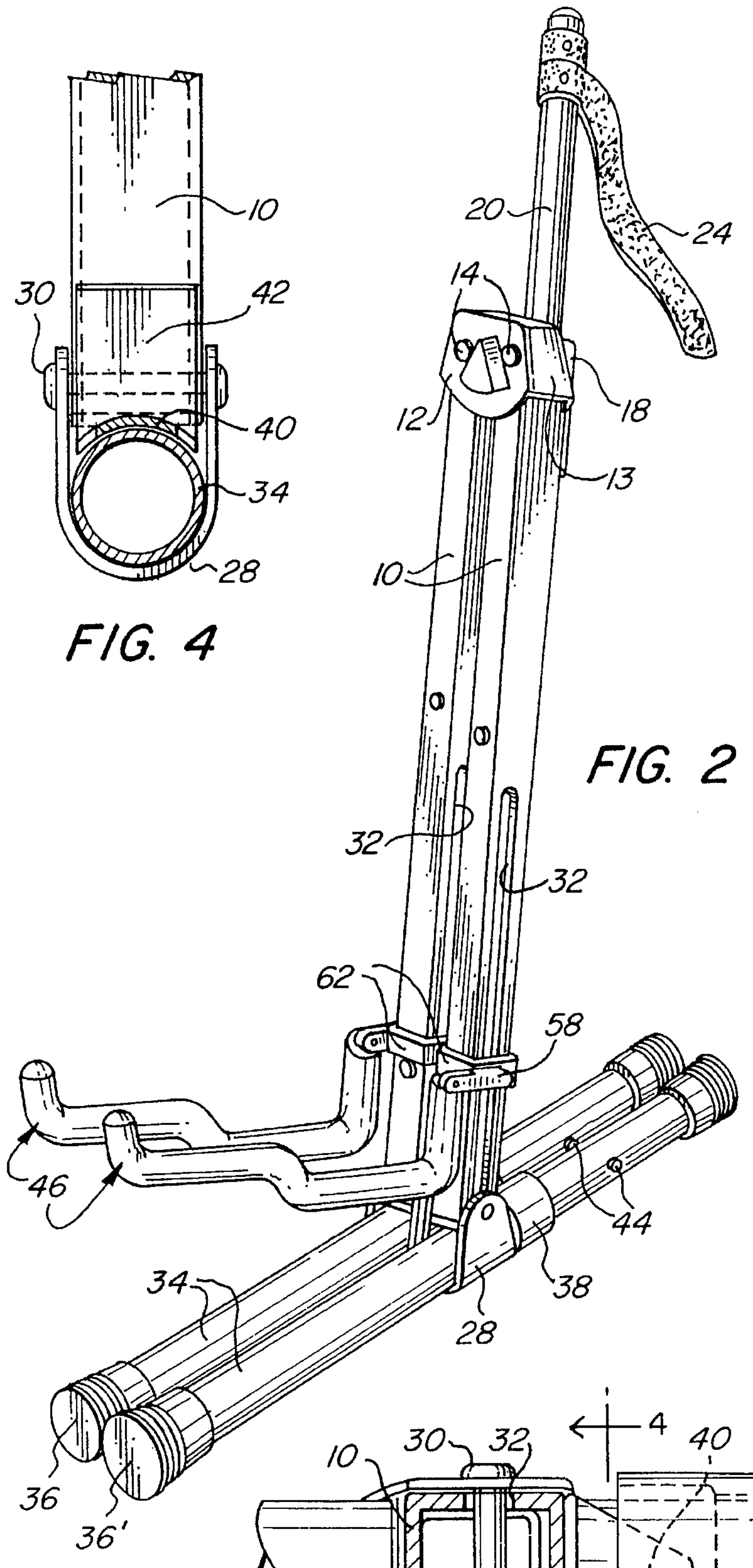
FIG. 3
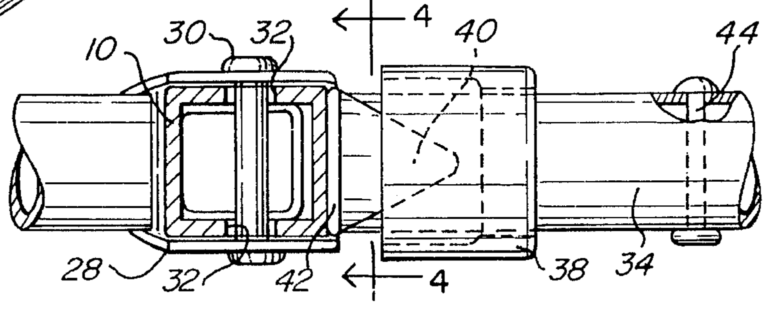

10
28
30
32
34
36
36'
38
40
42
44
46
48
50
52
53
54
55
56
58
60
62
64
66
68
6
7
8

A-FRAME INSTRUMENT STAND

BACKGROUND OF THE INVENTION

Stands used for supporting musical instruments, such as guitars, keyboards, and the like, must be sturdy, strong, and stable. In addition however it is generally advantageous that such stands be constructed to permit collapse to a compact configuration, and most desirably they will be built so as to minimize the number of detachable pieces, which can be misplaced and which must be assembled for use.

SUMMARY OF THE INVENTION

Accordingly, it is the broad object of the present invention to provide a novel stand for musical instruments and the like that incorporates and affords the foregoing features and advantages.

A more specific object of the invention is to provide a stand of generally A-frame construction, which may be adapted for the support of guitars of different body styles and dimensions, as well as for supporting a plurality of such instruments simultaneously and in tandem relationship.

Additional objects of the invention are to provide such a stand in which instruments are held in a manner that is very secure and that yet maintains the instruments readily accessible to the musician.

Further objects of the invention are to provide a stand having the foregoing features and advantages, in which a high degree of stability is afforded and which is small and compact and of relatively incomplex, facile, and inexpensive construction.

It has now been found that certain of the foregoing and related objects are readily attained by the provision of a collapsible stand comprising at least one pair of leg members; connecting means for pivotably interconnecting the leg members for movement between a collapsed position adjacent one another and an erected position in which they diverge from the connecting means; a pair of elongate foot members; and a mounting piece pivotably attaching one of the foot members to each leg member, the mounting pieces and the leg members having cooperating structure enabling slidable movement of the mounting pieces between positions disposed at lower end portions of the leg members and positions displaced therealong. The stand also includes locking means for disengageably securing the foot members in a fixed relationship to the leg members with the mounting pieces disposed at end portions thereof, such that the leg members have an upstanding attitude (desirably at 15° to 20° from vertical) with the foot members resting upon a horizontal surface. The mounting pieces also permit pivoting of the foot members to collapsed positions lying adjacent the leg members and displaced from the end portions thereof.

The stand will usually include an instrument-supporting arm assembly on each leg member, the arm assemblies comprising a rigid arm piece and a piece mounting the arm assembly for slidable movement along the associated leg member. Joining means permits movement of the arm pieces between collapsed positions, lying adjacent the associated leg member, and erected positions in which they extend forwardly for the cooperative, underlying support of a musical instrument. The pieces of the arm assembly will desirably be pivotably joined, and will have surface portions that abut one another in the erected arm position for limiting movement of the arm piece away from the associated leg member.

A support post may also be mounted for movement (typically by pivoting) between a folded position extending from adjacent the connecting means and directed generally toward the end portions of the leg members, and an erected, oppositely extending position. Gripping means adjacent one end of the post will be constructed and disposed for engaging a supported instrument, such means desirably taking the form of a strap having fastening elements thereon for securing it about a portion (usually, the neck) of the supported instrument. The mounting means for the post is so constructed as to prevent its movement in forward and lateral directions, i.e., in the directions in which displacement of the instrument would otherwise tend to occur.

In certain preferred embodiments the stand will include at least one pair of instrument-supporting arm members attached to the leg members, each arm member comprising a rigid arm piece mounted on an associated leg member for forward extension therefrom for the cooperative, underlying support of a musical instrument. The arm pieces include a connecting portion for operative connection to the leg member, a distal portion spaced from the connecting portion, and a proximal portion disposed between the distal and connecting portions and offset from the distal portion. The arm pieces are so configured that, with the leg members upstanding, the distal portions will lie substantially in a first plane and the proximal portions will lie substantially in a second plane, the second plane being disposed at a level generally lower than that of the first. The proximal portions define a first space between the distal and connecting portions, for the receipt of an instrument body, and the distal portions are dimensioned and configured for the receipt and support of an instrument body. Most desirably, the arm pieces will have upturned free forward end portions defining, in cooperation with the connecting portions, a second space for receiving an instrument body (supported on the distal portions) that is deeper than that which can be received in the first-mentioned space. The distal and proximal portions of the arm pieces will usually be substantially rectilinear, with the planes on which they lie being substantially flat and oriented at an angle of about 15° to 20° to horizontal.

In other preferred embodiments the stand will include a second pair of arm members and a second pair of leg members, the second leg members being spaced rearwardly of the first pair and supported on the foot members at substantially the same upstanding attitude, thereby defining an intermediate space for the receipt of an instrument body. The second pair of arm members will extend forwardly from the leg members of the second pair for the cooperative, underlying support of a musical instrument received in the intermediate space.

In additional embodiments the stand will further include a pair of embracing members, one attached to each leg member of a pair. The embracing members will include an element that projects laterally outwardly of the stand, and an element that extends forwardly from the lateral element at a point spaced outwardly of the stand, the elements being disposed to extend, respectively, behind and along the sides of the body of an instrument supported on the arm members.

In yet further embodiments each foot member of the stand will have opposite end portions with floor-engaging elements thereon, at least one of such end portions having an axis that normally extends horizontally in use, and being of circular cross section. The floor-engaging element on that end portion of the foot member will have a generally elliptical external cross section, so that rotation about the axis of the leg portion will vary the spacing above the support surface, and thereby enable facile leveling of the stand.

BRIEF DESCRIPTION OF THE DRAWINGS

FIG. 2 is a perspective view of the stand of FIG. 1, shown with the legs in closed configuration;

FIG. 3 is a fragmentary sectional view, drawn to an enlarged scale, showing portions of one of the leg members and the attached foot member of the stand of the foregoing Figures at the intersection therebetween;

FIG. 4 is a sectional view taken along line 4—4 of FIG. 3;

DESCRIPTION OF THE PREFERRED AND ILLUSTRATED EMBODIMENTS

Figure 1:
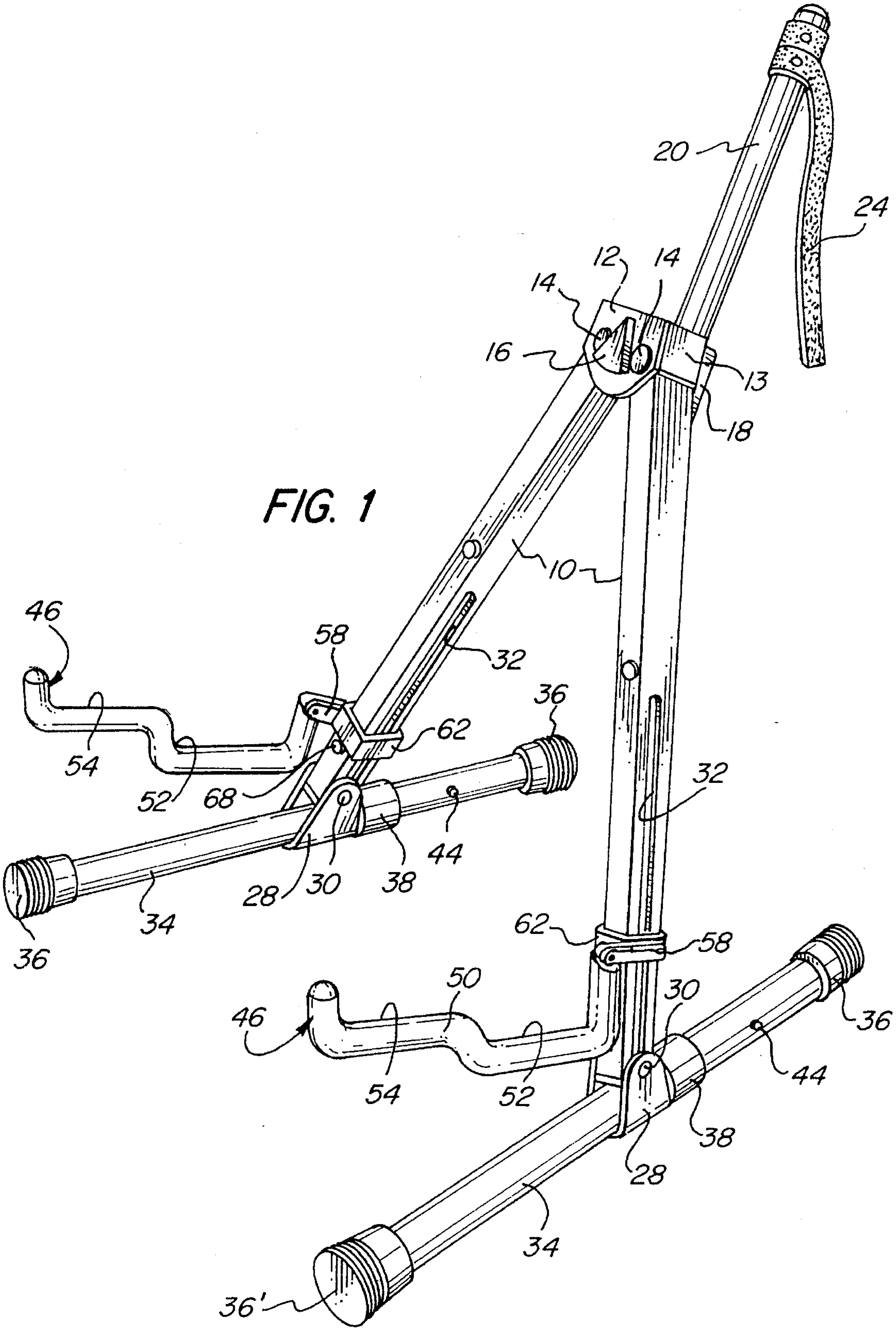
FIG. 1 is a perspective view showing an A-frame stand embodying the present invention, in erected configuration.
Figures 5, 6, 7:
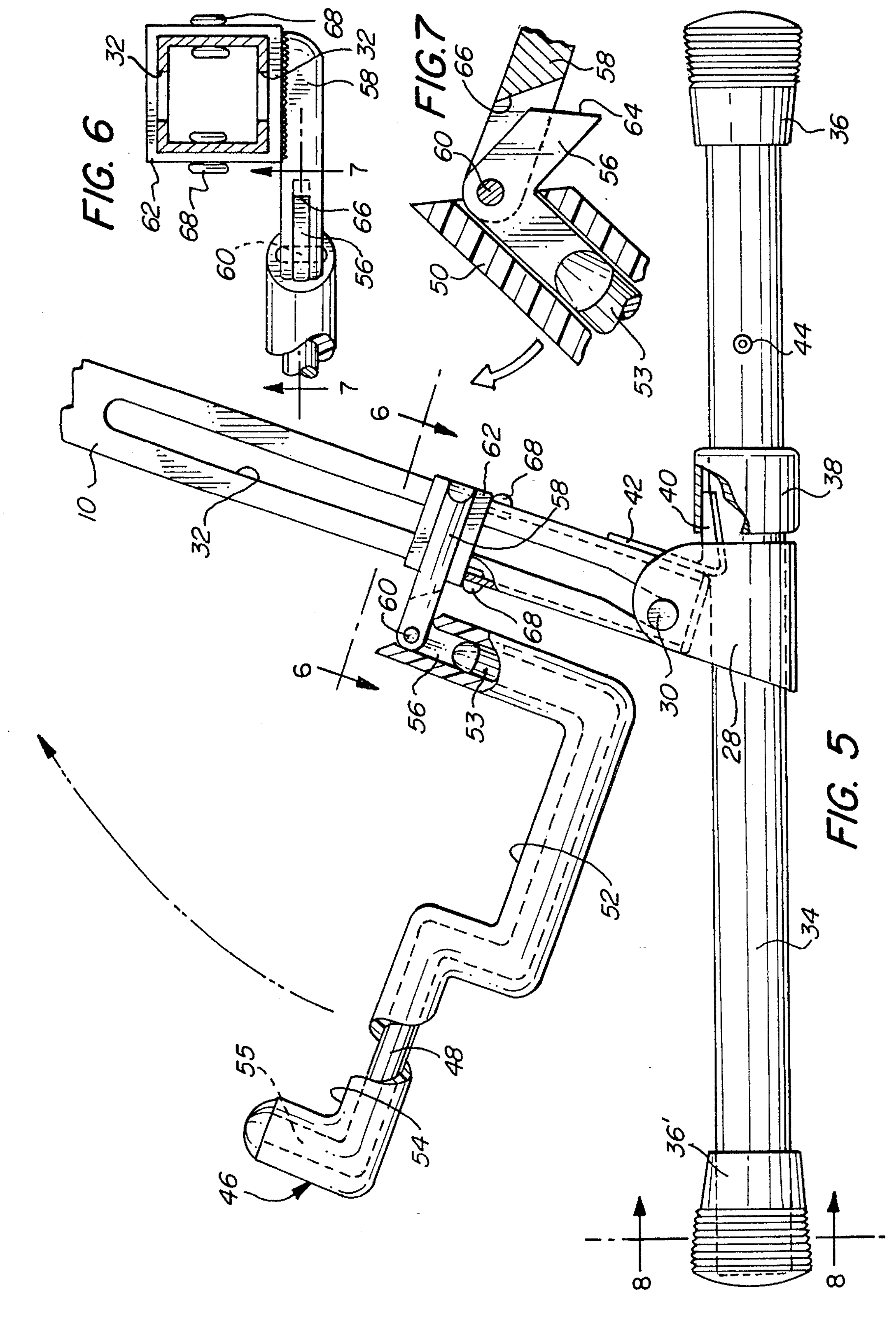
FIG. 5 is a fragmentary side elevational view of the stand of FIGS. 1 and 2, with portions broken away to expose underlying features.
FIG. 6 is a sectional view taken along line 6—6 of FIG. 5.
FIG. 7 is a sectional view taken along line 7—7 of FIG. 6, showing the instrument-supporting arm member pivoted upwardly somewhat from the position of FIG. 5, and drawn to an enlarged scale.

Turning initially to FIGS. 1 through 10 of the drawings, the stand illustrated comprises a pair of leg members 10 fabricated from square metal stock and pivotably joined to a head piece 12 by rivets 14. Lateral elements 13 of the head piece 12 limit the mutual spreading of the legs 10, to attain the erected configuration depicted in FIG. 1, and a generally triangular member 16, of suitable cushioning material, is affixed to the front surface of the head piece 12 to serve as a back rest for the supported instrument.

A U-shaped mounting bracket 18 is affixed on the rear of the head piece 12; one end of a support post 20 is received in the bracket 18 and is pivotably joined thereto by a rivet 22. A strap 24 is attached to the opposite end of the post 20 for wrapped engagement about a part of the supported instrument (e.g. the neck of a guitar), conveniently being provided on its opposite sides with the elements of a hook and loop type fastener (i.e., VELCRO) for that purpose. Detents 26 are formed into the sides of the U-shaped bracket 18, and serve to maintain the post 20 in both its extended and its collapsed positions.

A U-shaped bracket 28 is also pivotably attached to each of the leg members 10 by a rivet 30, which passes as well through an elongated slot 32 extending longitudinally in opposite sidewall portions of the legs 10. Each bracket 28 receives and is affixed to an elongate cylindrical foot 34, the feet having end caps 36, 36' on their opposite ends. A collar 38 is slidably mounted on each foot 34 for engagement of the tongue portion 40 of an L-shaped brace 42, the latter being affixed on the back surface at the lower end of the leg; movement of the collar is limited by the rivet 44. The collar 38 is formed with an inside dimension that is sufficiently large to receive and frictionally engage the tongue portion 40, so as to lock it against the associated foot and thereby maintain the upright attitude of the leg 10 relative thereto.

An arm member, generally designated by the numeral 46, is mounted on each leg 10 and includes a rigid arm piece 48, covered by a cushioning material 50. The compound configuration of the arm piece 48 forms two supporting sections, section 52 being disposed at a level slightly below that of section 54 and normally being of a depth (front-to-rear) appropriate for receiving the body of an electric guitar. The added length of section 52 will normally provide a space (between the attaching portion 53 and the upturned outer portion 55) sufficient for receiving the body of an acoustic guitar, the front-to-back depth of which is of course substantially greater than that of an electric guitar body.

Attached to the portion 53 (as by welding) is an L-shaped bracket 56, which is pivotably mounted by a pin 60 that extends through the point of intersection of its leg elements and between the bifurcations of a mounting element 58. The mounting element 58 is affixed to a square sleeve section 62, which is in turn slidably mounted on the leg 10. An oblique surface 66 is formed between the bifurcations of the piece 58, and a mating end surface 64 is provided on the bracket 56; the surfaces 64, 66 abut one another when the arm member 46 is in its lowered position, and thereby serve to limit movement therebeyond. The assembly illustrated therefore permits the arm members to be pivoted between collapsed and erected positions, as well as permitting them to be raised and lowered on the associated leg, downward movement being limited by rivets 68.

Figure 8A:
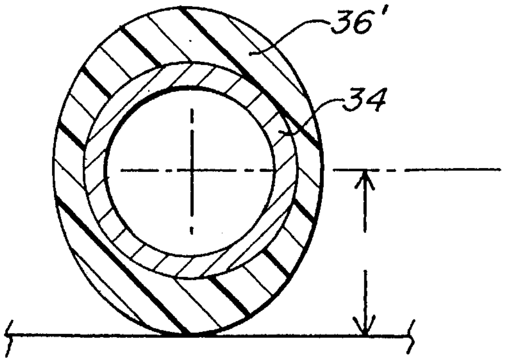
FIGS. 8A and 8B are sectional views taken along line 8—8 of FIG. 5, showing the elliptical end cap on the foot member in different orientations of rotation.
Figure 8B:
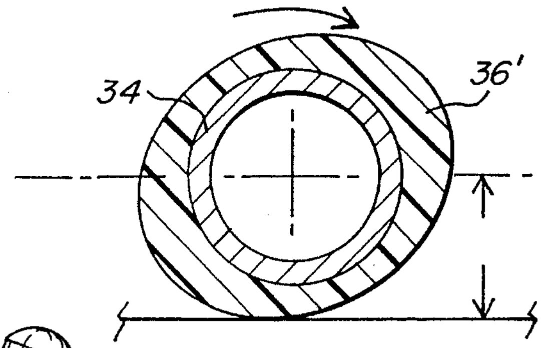
Figure 9:
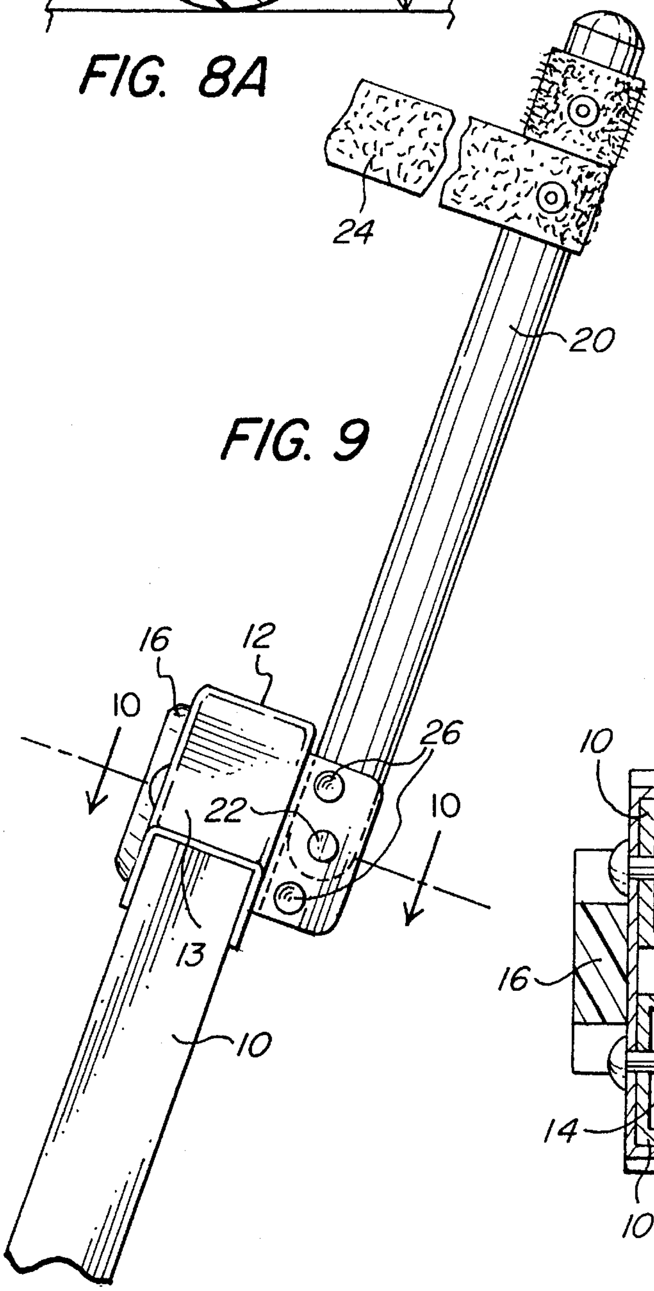
FIG. 9 is a fragmentary, side elevational view of an upper portion of the stand, with the supporting post in elevated position.
Figure 10:
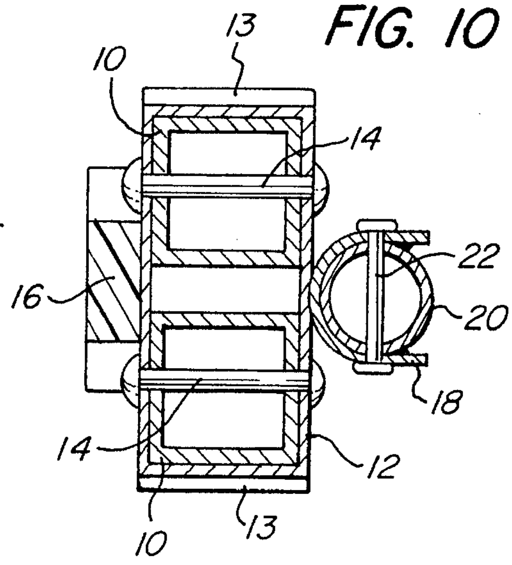
FIG. 10 is a sectional view taken along line 10—10 of FIG. 9.
Figure 11A:
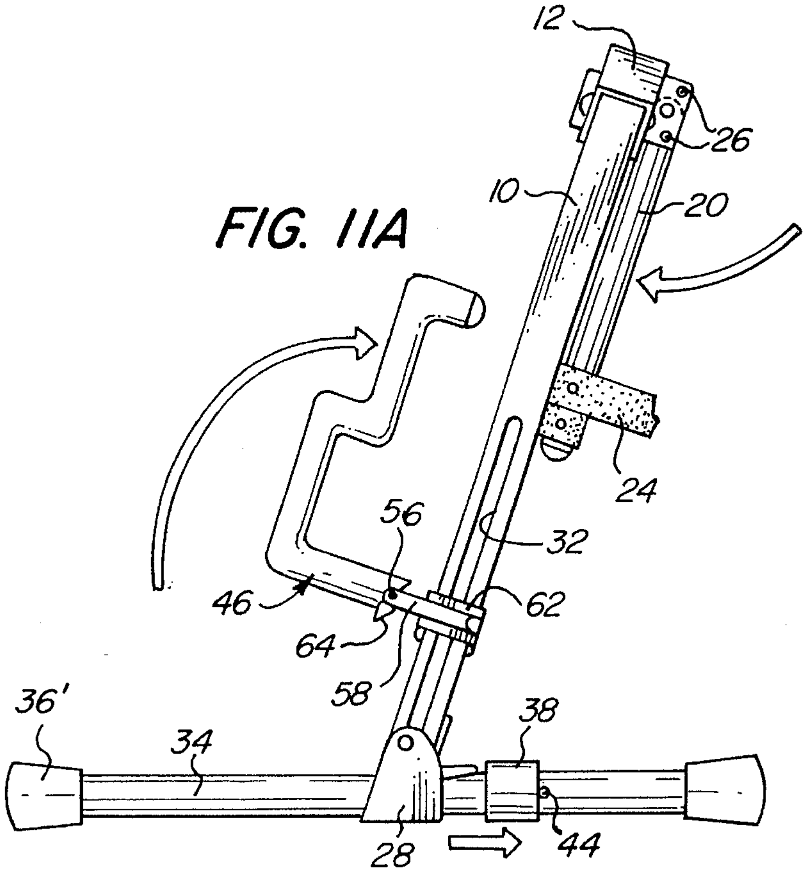
FIGS. 11A through 11C are side elevational views illustrating steps involved in collapsing the stand of the foregoing Figures.
Figure 11B:
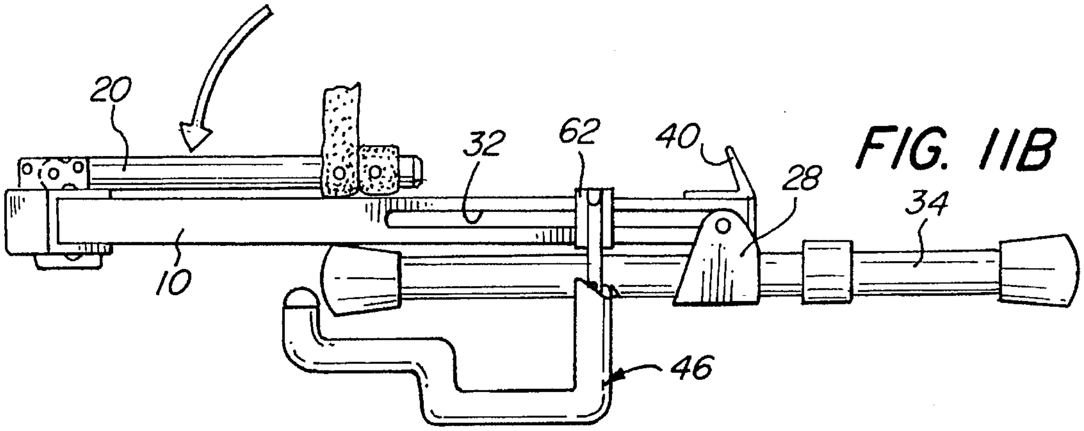
Figure 11D:
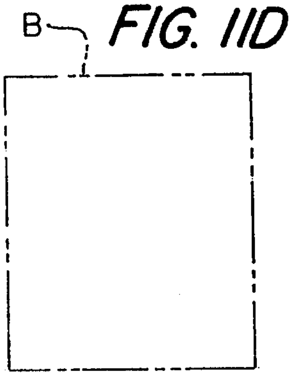
FIG. 11D is an end view depicting, in phantom line, the package for the collapsed stand, similarly shown in side elevation in FIG. 11C.
Figure 11C:
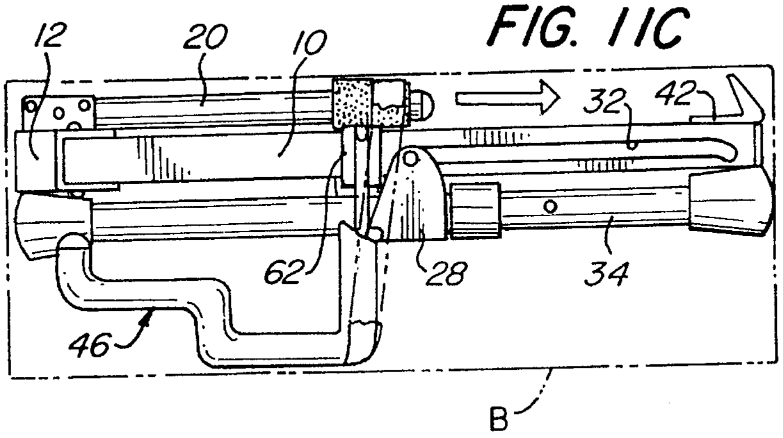

Turning now to FIG. 8 of the drawings, it will be noted that the end cap 36' has a generally elliptical external cross-sectional configuration and a circular cavity conforming to the outside diameter of the foot 34 on which it is seated. Consequently, rotation from the position shown in FIG. 8A to that of FIG. 8B will effectively lower the portion of the leg on which the cap 36' is provided, thereby enabling facile leveling of the stand to prevent rocking and afford maximum stability.

FIGS. 11 of the drawing depict steps involved in collapsing the stand from its erected configuration. Specifically, as shown in FIG. 11A the post 90 is folded downwardly to a position adjacent the legs 10, and the arm members 46 are folded upwardly to a lie proximate thereto. After sliding the collar 38 rearwardly, the legs 10 are folded against the feet 34 to the position shown in FIG. 11B. Compressing the assembly longitudinally, with the brackets 28 sliding in the slots 32 of the legs 10, brings the stand to the compact configuration of FIG. 11C, which also depicts (as does FIG. 11D) a box "B" in which the stand may be transported and/or stored.

Figure 12:
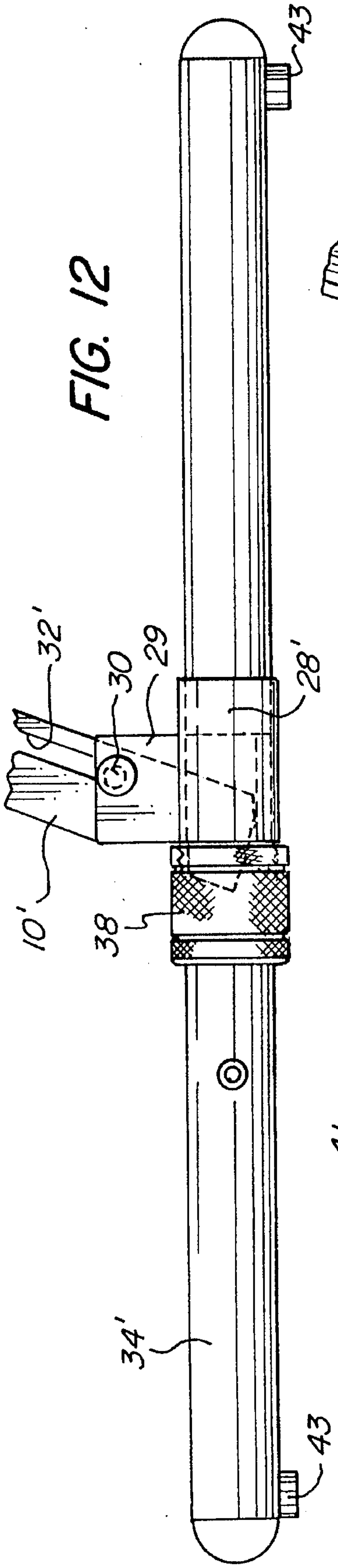
FIG. 12 is a fragmentary, side elevational view of a second embodiment of leg and foot member assemblies suitable for use in the stands of the invention.
Figure 13:
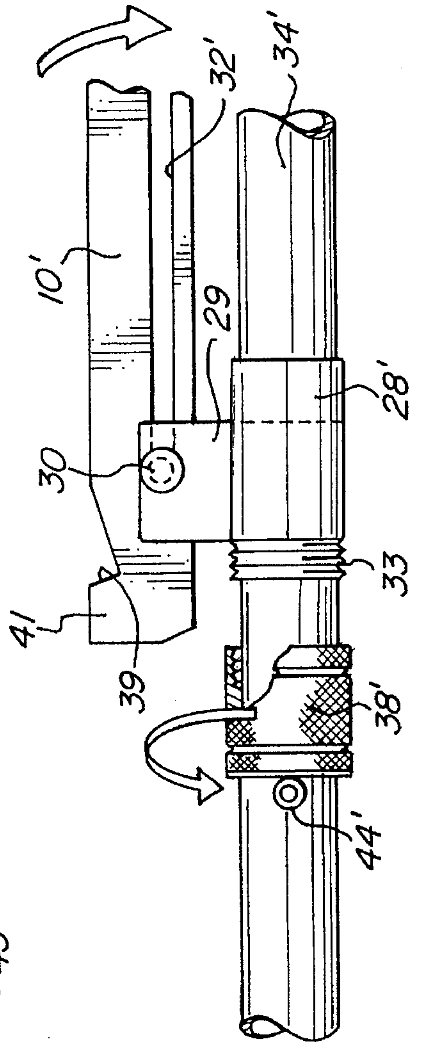
FIG. 13 is a fragmentary elevational view of the assembly of FIG. 12, showing the leg member folded to a collapsed position.
Figure 14:
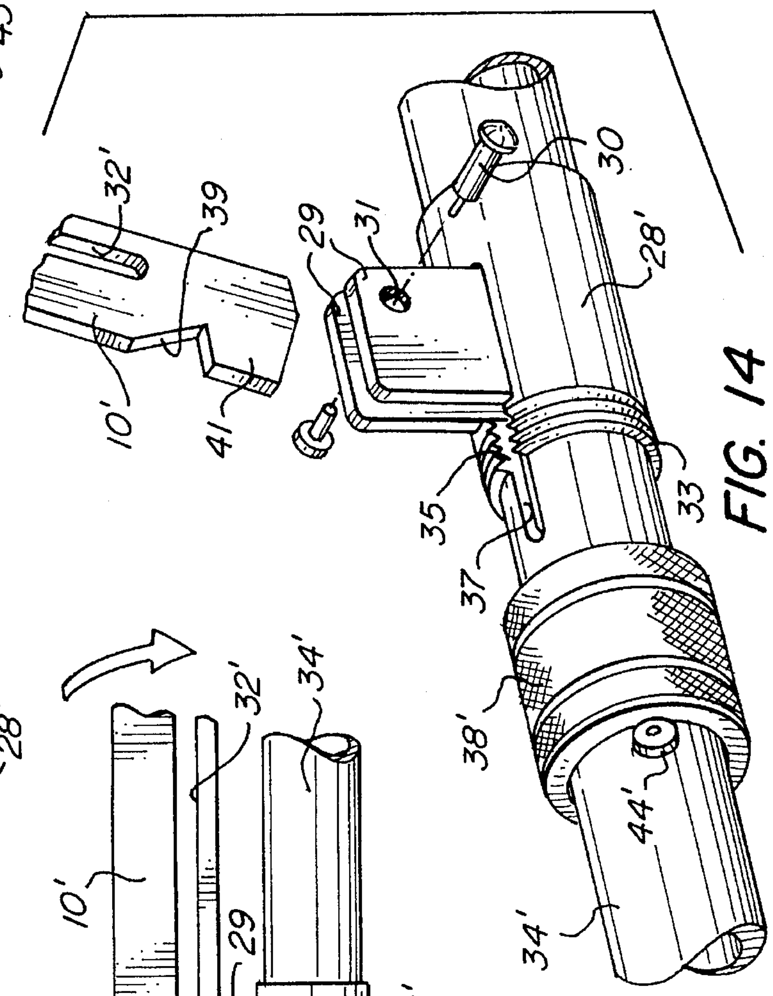
FIG. 14 is a fragmentary, exploded perspective view of the section of the assembly shown in FIG. 13, drawn to an enlarged scale.

FIGS. 12 through 14 illustrate a second form of the leg and foot assembly suitable for use in the stand of the invention. Where components are analogous to those of the previously described embodiment, the same numbers are used herein but modified by being primed.

More specifically, the coupling piece 28' takes the form of a short cylindrical element engaged upon the foot 34' and having a threaded end portion 33. Both the piece 28' and also the foot 34' are slotted, at 35 and 37 respectively, and a U-shaped insert is engaged therewithin to provide a pair of spaced ears 29. The lower end of the flat leg 10' is notched at 39 to define a toe element 41; that portion is received between the ears 29 and within the slots 35, 37, and is secured by a rivet 30 which passes through aligned apertures 31 in the ears 39 and slot 32' of the leg 10'.

A collar 38' is slidably mounted on the foot 34', and has a threaded interior end portion for engagement with the threaded portion 33 on the piece 28'. As seen in FIG. 12, the threadably engaged collar 38' enters the notch 39 and engages the toe element 41, to thereby lock the leg 10' is in its erected position. As will be noted, small contact pads 43 take the place of the end-caps 36 in this embodiment.

Figure 15B:
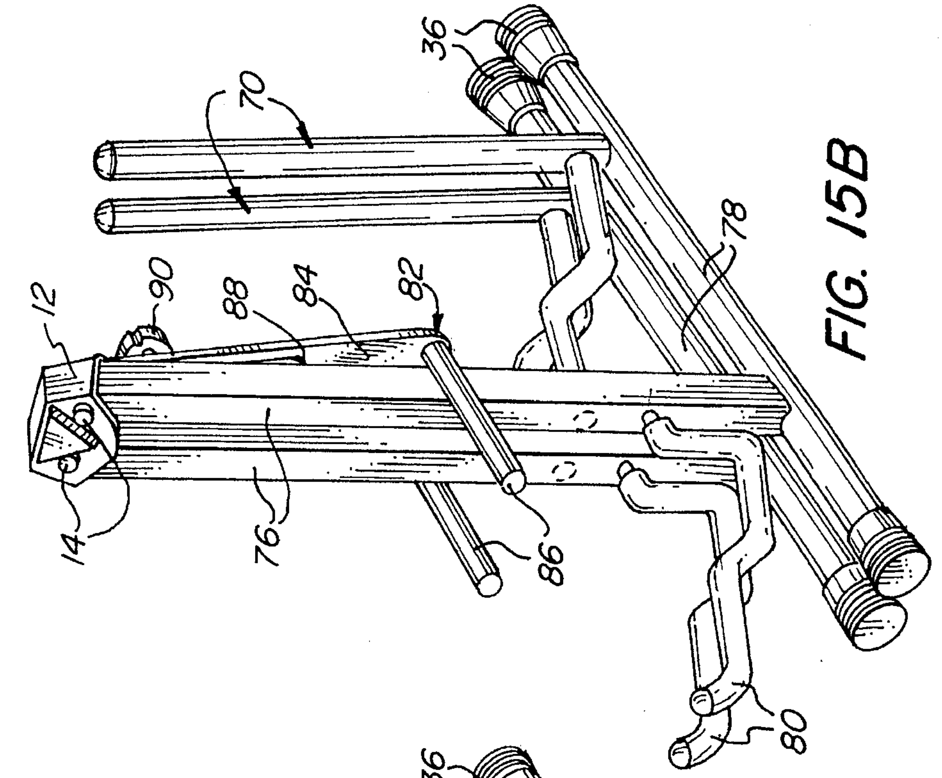
FIG. 15B is a similar view showing the stand in its collapsed configuration.
Figure 15A:
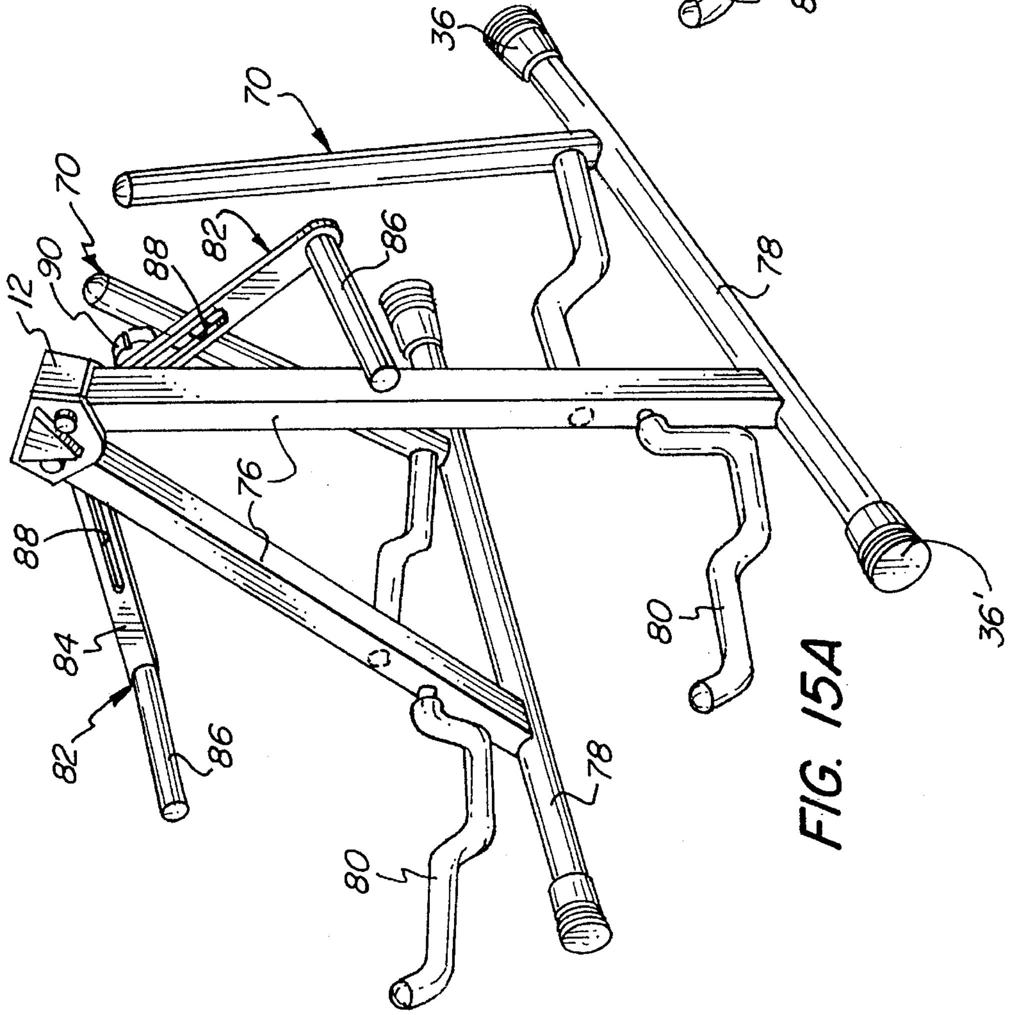
FIG. 15A is a perspective view of a tandem form of stand embodying the present invention, in erected configuration.
Figure 16:
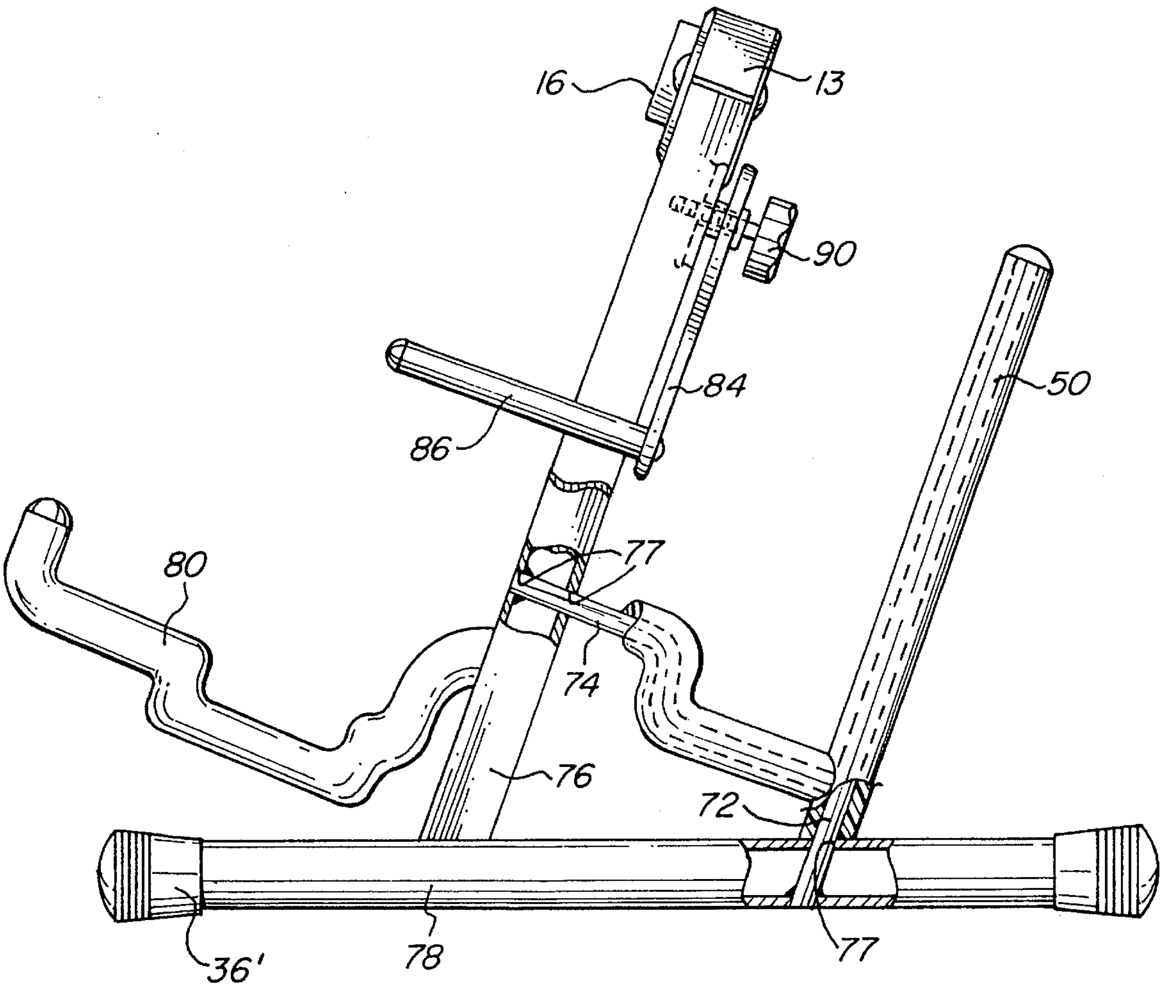
FIG. 16 is a side elevational view of the stand of FIGS. 15, with portions broken away to expose underlying features.

Turning finally to FIGS. 15 and 16 of the drawings, the tandem stand illustrated therein has features in common with that of the foregoing Figures, to the extent of which the same numbers are employed. It will be noted however that the legs and feet are joined in fixed relationships to one another, albeit that the use of pivotable members is feasible, as will be discussed hereinbelow.

The primary unique feature of the instant stand concerns of course the two added support members, generally designated by the numeral 70, which provide a section for supporting a second instrument, especially an electric guitar. As best seen in FIG. 16, each support member 70 consists of a leg piece 72 and an arm piece 74, the latter being affixed to the leg piece and extending at substantially a right-angle thereto. Aligned apertures 77 are formed through the legs 76 and feet 78, and serve to receive forward and lower end portions of the arm and leg pieces, 74 and 72, respectively. They are secured in place (as by welding), and are so formed as to orient the leg pieces 72 substantially parallel to the legs 76 with the arm pieces 74 in positions similar to those of the members 80. The offset configuration of the pieces 34 enables location of the body of an electric guitar within the rearward (lower) section thereof, in such manner so as to prevent the tremolo arm (which normally projects from the forward face of the body) from interfering against the legs 76. That spacing could of course be varied, as may be desired.

It will also be appreciated that the support members 70 may be hingedly connected to one another (as are the legs 76), and that they can be made disengagable from the remaining components of the stand, rather than being secured as previously indicated. In the later event, the foot members 78 could be attached to the legs 76 by pivotable and slidable means (as depicted in preceding Figures), so as to render the unit collapsible in like manner.

Another feature that may be incorporated to all forms of stands embodying the invention constitutes the embracing members shown in FIGS. 15 and 16 and generally designated by the numeral 82. Each embracing member consists of an elongate, laterally extending link 84 having a forwardly extending post 86 on its free, outer end. The inner end of the link 84 is slotted at 88 to receive a clamping screw 90, threadably engaged in the associated leg 76. The positions of the embracing members 82 are of course adjusted by pivoting and sliding them about the clamping screws 90, so as to bring the forwardly projecting posts alongside the body of the supported instrument, thereby providing lateral stability against accidental displacement from the stand. Conversely, it might be pointed out that the tandem character of the stand is highly convenient for use by the musician who employs two different guitars in his performance; the arrangement facilitates withdrawal and return of both instruments from a single position, thereby making changes very smooth and rapid.

It will be appreciated that other modifications can be made as well without departure from the concepts of the present invention. For example, rather than utilizing the depicted pin and slot arrangement, the foot members could be attached to a sleeve that is similarly slidable along the associated leg. And although the foregoing description emphasizes the construction of stands for supporting guitars, the same concepts are broadly applicable to stands intended for other purposes, e.g., for keyboards, audio equipment, and the like. The "A-frame" configuration may of course be varied, and it may indeed be augmented as by extending the legs beyond the pivot point so as to provide a generally X-shaped assembly. That form of stand would be particularly useful for an electronic keyboard, with the portions of the legs disposed upwardly of the pivot providing two-point support for the instrument. Finally, the elliptical end cap used for leveling of the stand may be employed on any of a wide diversity of structures, provided they have at least four legs and a portion for mounting the cap for rotation about a normally horizontal axis; indeed, the element may take the form of an open-ended tubular piece of elliptical external cross section, positionable inwardly of the end of a mounting leg.

Thus, it can be seen that the present invention provides a novel stand for musical instruments and the like, which incorporates and affords the features and advantages first mentioned above. The stand will normally be of generally A-frame construction, and may be adapted for the support of guitars of different body styles and dimensions, as well as for supporting a plurality of such instruments simultaneously and in tandem relationship. The instruments are held in a manner that is very secure, and that nevertheless maintains them readily accessible to the musician; the stand affords a high degree of stability, and is small and compact and of relatively incomplex, facile, and inexpensive construction.

Having thus described the invention, what is claimed is:

1. A collapsible stand for supporting at least one musical instrument, comprising at least one pair of leg members; connecting means for pivotably interconnecting the leg members of said pair for movement between a collapsed position adjacent one another and an erected position in which said leg members diverge from said connecting means, each of said leg members having a lower end portion spaced from said connecting means; a pair of elongate foot members; a mounting piece pivotably attaching one of the foot members of said pair to each of said leg members, said mounting pieces and said leg members having cooperating structure thereon enabling slidable movement of said mounting pieces between positions disposed at said end portions of said leg members and positions displaced therealong; and locking means for disengageably securing said foot members in a fixed relationship to said leg members with said mounting pieces disposed at said end portions thereof, said leg members having an upstanding attitude in said fixed relationship and with said foot members resting upon a horizontal surface, said mounting pieces permitting pivoting of said foot members to collapsed positions lying adjacent said leg members and displaced from said end portions thereof.

2. The stand of claim 1 additionally including an instrument-supporting arm assembly on each of said leg members, each of said arm assemblies comprising a rigid arm piece and a mounting piece mounting said arm assembly for slidable movement along the associated leg member, said pieces of said arm assembly being joined by joining means permitting movement of said arm pieces between collapsed positions, lying adjacent the associated one of said leg members, and erected positions in which said arm pieces extend forwardly from said leg members for the cooperative, underlying support of a musical instrument.

3. The stand of claim 2 wherein said joining means of each of said arm assemblies pivotably joins said arm piece to said mounting piece thereof, said pivotably joined pieces having surface portions thereon that abut one another in said erected position of said arm assembly for limiting movement of said arm piece away from said associated leg member.

4. The stand of claim 2 additionally including a neck support post having opposite ends and being mounted for movement between a collapsed position, extending from adjacent said connecting means generally toward said end portions of said leg members, and an erected position extending from adjacent said connecting means in a direction generally away from said leg member end portions, said post being constrained in said erected position against lateral and forward movement, and having gripping means, adjacent one of said ends thereof, constructed and disposed for engaging a supported instrument with said post in said erected position.

5. The stand of claim 4 wherein the end opposite said one end of said post is pivotably attached to said connecting means, and wherein said gripping means comprises a strap having fastening elements thereon for securing said strap about a portion of the supported instrument.

6. The stand of claim 1 wherein, at said upstanding attitude said leg members are oriented at an angle of about 15° to 20° from vertical.

7. The stand of claim 1 wherein each foot members has opposite end portions with floor-engaging elements thereon, at least one of said opposite end portions of at least one of said foot members having an axis that normally extends horizontally in the position of use of said stand, and being of circular cross section in planes transverse to said axis; at least one of said floor-engaging elements being seated on said at least one opposite end portion for rotation about said axis, said one element having a generally elliptical external cross section, taken in planes transverse to said axis, so that rotation of said one element will vary the spacing of said axis from a surface on which said stand is supported.

8. A collapsible stand for supporting at least one musical instrument, comprising at least one pair of leg members; connecting means for pivotably interconnecting the leg members of said pair for movement between a collapsed position adjacent one another and an erected position in which said leg members diverge from said connecting means, each of said leg members having a lower end portion spaced from said connecting means; a pair of elongate foot members, one of which is attached to said lower end portion of each of said leg members for supporting said leg members at an upstanding attitude with said foot members resting upon a horizontal surface; and at least one pair of instrument-supporting arm members attached to said leg members, each arm member of said one pair including a rigid arm piece and being mounted on an associated leg member for forward extension therefrom for the cooperative, underlying support of a musical instrument, each arm piece including a connecting portion for operative connection to said associated leg member, a distal portion spaced from said connecting portion, a proximal portion disposed between said distal and connecting portions and offset from said distal portion, and an upturned free forward end portion on said distal portion, said arm pieces being so configured that, with said leg members at said upstanding attitude, said distal portions lie substantially in a first plane and said proximal portions lie substantially in a second plane disposed at a level generally lower than said first plane, said proximal portions of said arm piece being dimensioned and configured to define a first space between said distal and connecting portions for the receipt, and support on said proximal portions, of an instrument body, said distal portions being dimensioned and configured to define a second space between said forward end portions and said connecting portions for the receipt, and support on said distal portions, of an instrument body.

9. The stand of claim 8 wherein said distal and proximal portions of said arm pieces are substantially rectilinear, and wherein said first and second planes are substantially flat and are oriented at an angle of about 15° to 20° to horizontal with said leg members at said upstanding attitude, said leg members being disposed substantially in a third plane perpendicular to said first and second planes.

10. A collapsible stand for supporting at least one musical instrument, comprising a first pair of leg members; connecting means for pivotably interconnecting the leg members of said first pair for movement between a collapsed position adjacent one another and an erected position in which said leg members diverge from said connecting means, each of said leg members having a lower end portion spaced from said connecting means; a pair of elongate foot members, one of which is attached to said lower end portion of each of said leg members of said first pair for supporting said leg members at an upstanding attitude with said foot members resting upon a horizontal surface; a first pair of instrument-supporting arm members attached to said leg members of said first pair for forward extension therefrom for the cooperative, underlying support of a musical instrument; and a second pair of arm members and a second pair of leg members, said second pair of leg members being spaced rearwardly of said first pair of leg members and supported on said foot members at substantially said upstanding attitude, said first and second pairs of leg members defining therebetween an intermediate space for the receipt of an instrument body, and said second pair of arm members being attached to said leg members of said second pair and extending forwardly therefrom for the cooperative, underlying support of a musical instrument received in said intermediate space.

11. A collapsible stand for supporting at least one musical instrument, comprising at least one pair of leg members; connecting means for pivotably interconnecting the leg members of said pair for movement between a collapsed position adjacent one another and an erected position in which said leg members diverge from said connecting means, each of said leg members having a lower end portion spaced from said connecting means; a pair of elongate foot members, one of which is attached to said lower end portion of each of said leg members for supporting said leg members at an upstanding attitude with said foot members resting upon a horizontal surface; and at least one pair of instrument-supporting arm members attached to said leg members for forward extension therefrom for the cooperative, underlying support of a musical instrument; said stand further including a pair of embracing members, one of said embracing members being attached to each of said leg members and including a lateral element that extends laterally outwardly of said stand from the associated one of said leg members, and a forward element that extends forwardly from said lateral element at a point spaced laterally outwardly of said stand, said lateral and forward elements being disposed to extend, respectively, behind and along the sides of the body of an instrument supported on said arm members.

12. The stand of claim 11 wherein each of said lateral elements is elongated and is attached to said associated leg member by attachment means that permits, in cooperation with said lateral element, pivotable and slidable movement of said embracing member about the point of attachment and laterally inwardly and outwardly thereof.

13. A collapsible stand for supporting at least one musical instrument, comprising at least one pair of leg members; connecting means for pivotably interconnecting the leg members of said pair for movement between a collapsed position adjacent one another and an erected position in which said leg members diverge from said connecting means, each of said leg members having a lower end portion spaced from said connecting means; a pair of elongate foot members, one of which is attached to said lower end portion of each of said leg members for supporting said leg members at an upstanding attitude with said foot members resting upon a horizontal surface; and at least one pair of instrument-supporting arm members attached to said leg members attached to said leg members for forward extension therefrom for the cooperative, underlying support of a musical instrument; each foot member having opposite end portions with floor-engaging elements thereon, at least one of said opposite end portions of at least one of said foot members having an axis that normally extends horizontally in the position of use of said stand, and being of circular cross section in planes transverse to said axis; at least one of said floor-engaging elements comprising an end-cap seated on said at least one opposite end portion for rotation about said axis, said end-cap having a generally elliptical external cross section, taken in planes transverse to said axis, so that rotation of said end-cap will vary the spacing of said axis from a surface on which said stand is supported.

* * * * *

UNITED STATES PATENT AND TRADEMARK OFFICE
CERTIFICATE OF CORRECTION

PATENT NO. : 5,505,413

DATED : April 9, 1996

INVENTOR(S) : JAMES R. HENNESSEY

It is certified that error appears in the above-identified patent and that said Letters Patent is hereby corrected as shown below:

Claim 13, column 10, line 8, delete "attached to said leg members".

Signed and Sealed this

Second Day of July, 1996

Attest:

BRUCE LEHMAN

*Attesting Officer* *Commissioner of Patents and Trademarks*